United States Patent [19]

Williams

[11] 4,375,077

[45] Feb. 22, 1983

[54] POWER SUPPLY REGULATOR CIRCUIT EMPLOYING A TRANSFORMER HAVING A CONTROL WINDING

[75] Inventor: James B. Williams, Framingham, Mass.

[73] Assignee: Data General Corporation, Westboro, Mass.

[21] Appl. No.: 238,530

[22] Filed: Feb. 26, 1981

[51] Int. Cl.[3] .......... H02P 13/12

[52] U.S. Cl. .......... 363/91; 323/251; 323/254

[58] Field of Search .......... 307/416–418; 323/249, 251, 254, 259, 262, 263, 329, 332–335; 330/8; 363/75, 82, 89–93, 101

[56] References Cited

U.S. PATENT DOCUMENTS 2,611,889 9/1952 Huge .......... 363/91
3,065,399 11/1962 McNamee .......... 323/263 X
3,076,131 1/1963 Weil .......... 363/91 X
3,217,239 11/1965 Lunney .......... 363/91 X
3,421,025 1/1969 Mitchell et al. .......... 361/56 X
3,571,699 3/1971 Thaler .......... 323/251

FOREIGN PATENT DOCUMENTS 526865 8/1976 U.S.S.R. .......... 323/259

*Primary Examiner*—A. D. Pellinen
*Attorney, Agent, or Firm*—Robert Dulaney

[57] ABSTRACT

A circuit for regulation of a D.C. output voltage in a switching power supply. The circuit contains a control transformer having primary, secondary and control windings. The output of the circuit is connected from the primary and secondary windings and is controlled by a switching element connected from the control winding. The circuit output error is provided to duty cycle modulation circuitry which varies the duty cycle of the switching element, thereby controlling the output voltage level.

3 Claims, 2 Drawing Figures

POWER SUPPLY REGULATOR CIRCUIT EMPLOYING A TRANSFORMER HAVING A CONTROL WINDING

BACKGROUND OF THE INVENTION

1. Field of the Invention

The present invention is related generally to power supplies and more particularly to regulation of a D.C. output voltage in a multi-output switching power supply.

2. Description of the Prior Art

In some power supplies, multiple secondary windings on the same transformer are used to generate multiple outputs. For example, one secondary winding could have the appropriate number of turns to yield a +5 v output, while a second secondary winding could have a different number of turns to yield a +12 v output.

In addition to the ratio of primary-to-secondary windings, further control is normally required to ensure the output is held reasonably constant. This control usually is achieved in a switching power supply by returning a feedback from one of the outputs and using this to control the duty cycle of the transistor(s) driving the transformer primary. Only one of the multiple outputs can act as the source of the feedback signal and, because the other outputs will not always track accurately enough, additional regulation is required for the non-controlling outputs.

The common methods for providing this extra regulation for the outputs which do not have direct feedback to the source are by means of a linear series pass regulator or a switching buck regulator. Both circuits involve the use of a regulating element, usually a transistor. Since the output current flows through the regulating element, a substantial amount of power is dissipated. The regulating element and the associated heat sink must, therefore, be of sufficient size and durability to withstand the environment. This prior art approach is functional, but is undesirable because of the size and cost of the components required and the power wasted in the form of heat.

The use of a tranformer in a linear regulator circuit is known in the prior art. However, no usage of a transformer in a switching power supply is known and no usage of a transformer of the design of the present invention is known in either type of power supply.

The present invention relates to a novel circuit for providing the additional regulation required by the multiple outputs which is free of the above noted problems.

BRIEF SUMMARY OF THE INVENTION

The present invention relates to apparatus for voltage regulation. A circuit for implementing the invention includes a transformer, apparatus for rectifying the outputs of the transformer, and apparatus connected to the transformer for controlling the circuit output.

It is a feature of the present invention that the transformer has at least one primary winding, at least one secondary winding and at least one control winding.

It is a further feature that the apparatus for controlling the circuit output includes a switching transistor, coupled to the one or more control windings, and apparatus for controlling the duty cycle of the switching transistor.

It is an advantage of the invention that voltage regulation can be performed with a switching element of reduced size and cost.

It is another advantage that the heat sink required for the switching element can be substantially reduced in size.

It is yet another advantage that the switching inductor in the output filter of the circuit can be substantially reduced in size and cost.

Other features and advantages of the present invention will be understood by those of ordinary skill in the art after referring to the detailed description of the preferred embodiment and drawings wherein:

DESCRIPTION OF THE PREFERRED EMBODIMENT

Introduction

Figure 1:
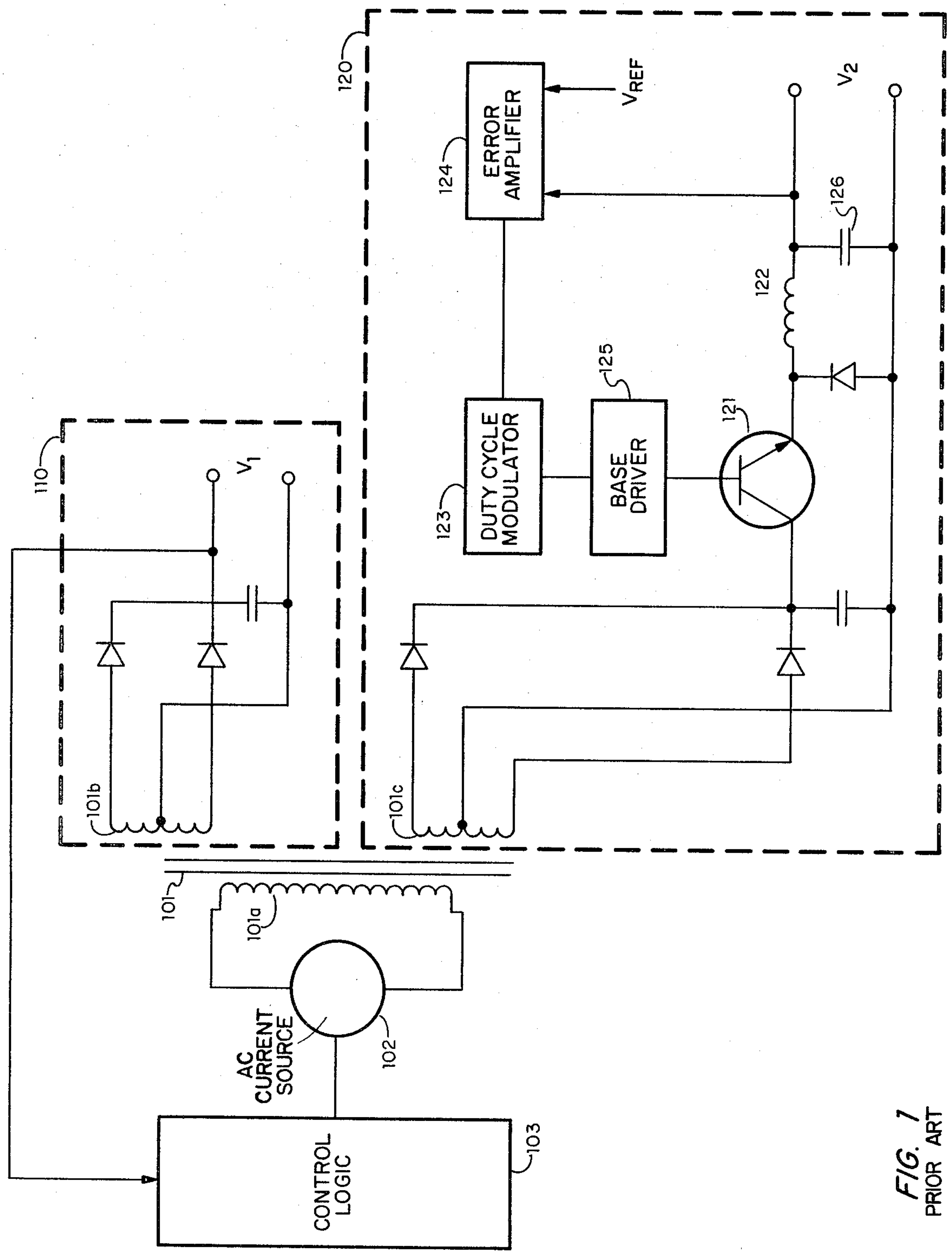
FIG. 1 PRIOR ART
FIG. 1 is a diagram illustrating a conventional prior art regulator circuit.

Referring to FIG. 1, a simplified prior art circuit is shown. Transformer 101 has primary winding **101*a* and can have multiple secondary windings, only two of which, 101*b* and 101*c*, are shown here for clarity. Transformer 101 is driven by current source 102. The turns ratio of secondary winding 101*b* to primary winding 101*a* is selected to yield a certain desired output voltage V1. Winding 101*c* has a different number of turns to yield a different output voltage V2. In the circuit of FIG. 1, output V1 is fed back to control logic 103 which adjusts source 102 to keep output V1 at the desired level. Output V2 will track the changes of source 102, but additional regulation is normally required to keep output V2** within the desired tolerances.

A common technique for accomplishing this in the prior art is shown in FIG. 1. Output V2 is provided to error amplifier 124 which compares it with reference voltage VREF. The error signal is provided to duty cycle modulator 123 which attempts to reduce the error by varying the duty cycle of switching transistor 121. The signal from duty cycle modulator 123 is provided to base driver 125 which supplies the appropriate current level to the base of switching transistor 121. Transistor 121 is, therefore, either "on" (i.e. allowing current to flow through it) or "off" (i.e. precluding current flow). Inductor 122 and capacitor 126 filter the output. Adjusting the ratio of transistor 121 on and off times provides the control of output V2.

Interconnection

Figure 2:
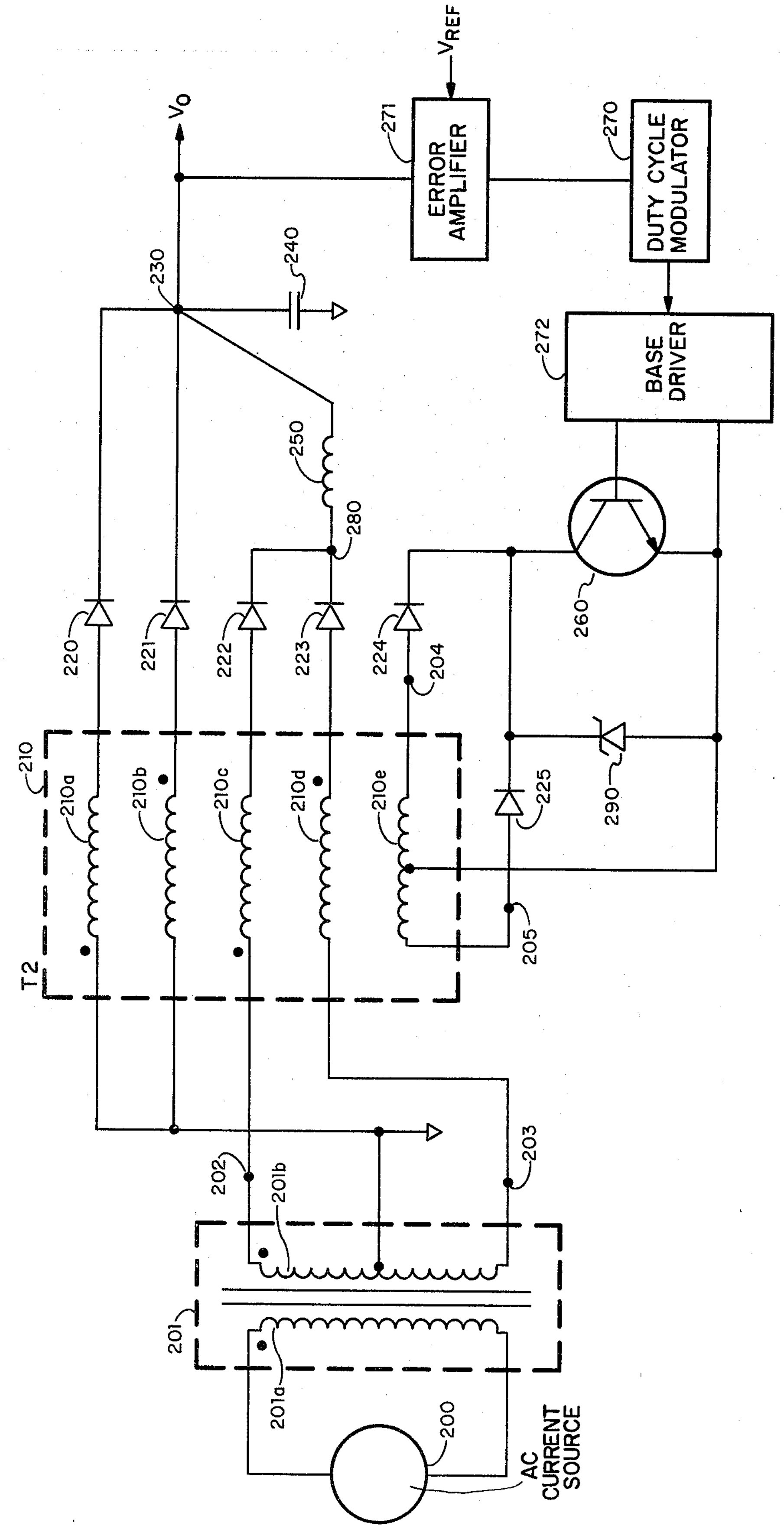
FIG. 2 is a diagram illustrating the invention.

Referring to FIG. 2, a preferred embodiment of the invention is shown. Input current source 200 provides an AC current to primary winding **201*a* of transformer 201. One output of secondary winding 201*b* is connected at terminal 202 to primary winding 210*c* of transformer 210. The other output of winding 201*b* is connected at terminal 203 to primary winding 210*d* of transformer 210. The center tap of winding 201*b* is connected to ground and to secondary windings 210*a* and 210*b* of transformer 210. The outputs of windings 210*a*, 210*b*, 210*c*, and 210*d* are connected to rectifying diodes 220, 221, 222 and 223 respectively. Diodes 220 and 221 are connected to common point 230. Diodes 222 and 223 are connected at common point 280 to switching inductor 250**, which is in turn connected to common point 230. Also connected to common point 230 is capacitor 240. Terminals 204 and 205 of center tap "control" winding 210*e* are connected to rectifying diodes 224 and 225 respectively, which are in turn connected to the collector of switching transistor 260 and to zener diode 290. The center tap of winding 210*e*, emitter of transistor 260 and zener diode 290 are connected to a reference voltage from base driver circuit 272. Capacitor 240 is connected to ground. Output voltage Vo and reference voltage VREF are supplied to error amplifier 271. The output of error amplifier 271 is connected to duty cycle modulator network 270, which is in turn connected to the base driver circuit 272. Finally, base driver circuit 272 is connected to the base of transistor 260. Of course, the windings of transformers 201 and 210 are coupled magnetically.

Operation

The circuit of FIG. 2 can be considered to have two operating states: when transistor 260 is turned "on", and when transistor 260 is turned "off".

Looking at the first case, when transistor 260 is "on", it approximates a short circuit. Current can flow through transistor 260 and winding 210*e* is effectively shorted. Because of transformer action all windings of transformer 210 act as if they are shorted. The voltage at node 280 is substantially equal to the rectified voltage VI directly from transformer 201. Diodes 220 and 221 are reverse biased and windings 210*a* and 210*b* are effectively eliminated from the circuit.

Turning to the second case, when transistor 260 is "off", it approximates an open circuit and no current can flow through winding 210*e*. Therefore, if current Icd is flowing through winding 210*c* or 210*d*, then, because of transformer action, a current Iab must be flowing through winding 210*a* or 210*b*. Assuming windings 210*a* and 210*b* each have Nab turns and windings 210*c* and 210*d* of each have Ncd turns, then Iab=-(Icd)(Ncd/Nab). The voltage dropped across winding 210*a* or 210*b* is approximately output voltage Vo and the voltage dropped in winding 210*c* or 210*d* is (Vo)(Ncd/Nab).

Because the primary and secondary windings are coupled in opposite phase relationship, any voltage in the primary will subtract from the voltage in the secondary. The voltage at node 280, in the case where transistor 260 is off, will therefore be the rectified voltage VI from transformer 201 minus the voltage dropped in winding 210*c* or 210*d*, i.e. V280=VI−(Vo)(Ncd/Nab). Diodes 220, 221, 222 and 223 rectify the output at node 230 and inductor 250 and capacitor 240 act as an output filter to cause output voltage Vo to be essentially equal to the average voltage at node 280. Zener diode 290 acts as a voltage clamp and takes care of the leakage inductance effects of winding 210*e*.

Error amplifier 271 takes output voltage Vo and compares it to a reference voltage VREF. The error signal is provided to duty cycle modulator 270. Duty cycle modulator 270, which uses standard switching power supply modulator logic, operates at 40 khz. That is, duty cycle modulator 270 provides a signal to base driver 272 which will turn transistor 260 on and off once every 25 microseconds. The fractional part of this 25 microsecond period during which transistor 260 is on can be varied essentially from 0 to 1. By adjusting the ratio of transistor on time to transistor off time, output voltage Vo can be adjusted to maintain it at the appropriate level. By designing transformer 201 such that its rectified output voltage VI will always be larger than the desired regulator circuit output voltage VoD, and by selecting the turns ratio Ncd/Nab such that output voltage Vo when transistor 260 is off (i.e. VI/(1+Ncd/Nab)) will always be less than desired regulator circuit output voltage VoD, modulator 270 can maintain output voltage Vo at the desired output voltage VoD. If output voltage Vo is too low, transistor 260 will be left on for a larger proportion of the time, thereby raising the average output voltage Vo. Conversely, if Vo is too high, transistor 260 will be left off for a larger proportion of the time, thereby reducing the average output voltage Vo.

The primary advantages of the invention can now be understood. Because the voltage per turn is the same in all windings of a transformer, a voltage of Vo in windings 210*a* or 210*b* will result in a voltage across control winding 210*e* equal to Vo times the turns in winding 210*e* (i.e. Ne) divided by the turns in windings 210*a* and 210*b*. The voltage V260 seen by transistor 260 is therefore equal to Vo×(Ne/Nab). The current I260 seen by transistor 260 is equal to the output current Io times the turns in windings 210*c* and 210*d* divided by the turns in 210*e* (i.e. I260=Io×(Ncd/Ne)). The product of these two quantities can be calculated as:

$$V260 \times I260 = (VI - Vo) \times Io$$

In the prior art circuit shown in FIG. 1, the voltage current product of transistor 121 would be the rectified input voltage VI times the output current Io (i.e., V121×I121=VI×Io). Therefore, in applications where input voltage VI is significantly larger than VI−Vo, the voltage-current product seen by transistor 260 is considerably reduced from that seen by the transistor in the prior art circuit.

The situation is further enhanced by the fact that the number of turns Ne of control winding 210*e* is arbitrary and, therefore, the ratio of Ne to Nab and Ncd can be selected to give any desired peak transistor voltage or peak transistor current. Since the size and heat dissipation capability required of transistor 260 is more sensitive to current than voltage, Ne can be chosen to yield a low transistor current I260. The end result is that this design performs the task of voltage regulation with a significantly smaller and less expensive switching transistor than has been possible in the prior art. Because less heat must be dissipated by transistor 260, the associated heat sink can be made much smaller.

A size and cost savings is also realized with inductor 250. In the simplified prior art circuit of FIG. 1, the voltage seen by inductor 122 varies between zero when transistor 121 is off and a maximum value when transistor 121 is on. Inductor 122 must be of a size to handle these changes. In FIG. 2, however, switching inductor 250 sees much smaller changes in voltage between the on and off states of transistor 260. This allows the size of inductor 250 to be significantly reduced because of the lower voltage-current requirements placed on it.

The invention may be embodied in yet other specific forms without departing from the spirit or essential characteristics thereof. For example, the center tap rectifier configuration of transformers 201 and 210 could be replaced with a full wave bridge. As another example, the outputs of windings 210*a* and 210*b* could be connected at node 280, rather than node 230, thereby allowing slightly improved dynamic response of the circuit, but requiring transistor 260 to turn off into more unclamped inductive energy. The present embodiments are therefore to be considered in all respects as illustrative and not restrictive. The scope of the invention is indicated by the appended claims rather than by the foregoing description, and all changes which come within the meaning and range of equivalency of the claims are therefore intended to be embraced therein.

I claim:

1. Electrical apparatus for voltage regulation, said apparatus comprising:

a transformer, said transformer having at least one primary winding conductively connected between a voltage source and the output of said apparatus, at least one secondary winding conductively connected between ground and the output of said apparatus, and at least one control winding magnetically coupled to said at least one primary winding and said at least one secondary winding;

means for rectifying the outputs of at least said at least one primary winding and said at least one secondary winding; and control means connected to said at least one control winding whereby the output of said apparatus can be modified.

2. The apparatus of claim 1, wherein said at least one primary winding and said at least one secondary winding are coupled in relationship such that the combined voltage output of said at least one primary winding and said at least one secondary winding is substantially equal to the rectified voltage developed across said at least one secondary winding minus the rectified voltage developed across said at least one primary winding when said control means precludes current flow through said control winding and is substantially equal to the rectified voltage across said at least one primary winding when said control means allows current flow through said control winding.

3. Voltage regulation apparatus for accepting an AC voltage input and generating a substantially constant DC voltage output, said apparatus comprising:

a transformer, said transformer having at least one primary winding, said at least one primary winding being conductively connected between said AC voltage input and the output of said apparatus; at least one secondary winding, in opposite phase relationship to said at least one primary winding, conductively connected between ground and the output of said apparatus; and at least one control winding magnetically coupled to said at least one primary winding and said at least one secondary winding;

means for rectifying the current through said at least one primary winding and said at least one secondary winding;

means for controlling current flow through said at least one control winding;

means for connecting the outputs of said at least one primary winding and said at least one secondary winding such that the combined voltage output of said at least one primary winding and said at least one secondary winding is substantially equal to the rectified voltage of the voltage input when said controlling means allows current flow through said control winding and is substantially equal to the rectified voltage of the voltage input less the voltage across said at least one primary winding when said controlling means precludes current flow through said at least one control winding.

* * * * *